United States Patent
Stephan et al.

(10) Patent No.: US 11,774,003 B2
(45) Date of Patent: Oct. 3, 2023

(54) VALVE

(71) Applicant: Alfmeier Präzision SE, Treuchtlingen (DE)

(72) Inventors: Markus Stephan, Gnotzheim (DE); Erich Dörfler, Landsberg (DE); Tom Riedel, Weissenburg i.Bay. (DE); Werner Ruppert, Langenaltheim (DE)

(73) Assignee: Alfmeier Präzision SE, Treuchtlingen (DE)

( * ) Notice: Subject to any disclaimer, the term of this patent is extended or adjusted under 35 U.S.C. 154(b) by 351 days.

(21) Appl. No.: 17/160,770

(22) Filed: Jan. 28, 2021

(65) Prior Publication Data

US 2021/0231229 A1 Jul. 29, 2021

(30) Foreign Application Priority Data

Jan. 29, 2020 (DE) ...................... 20 2020 100 491.3
Jun. 22, 2020 (DE) ...................... 20 2020 103 584.3

(51) Int. Cl.
*F16K 31/20* (2006.01)
*B60K 15/03* (2006.01)
*B60K 15/035* (2006.01)

(52) U.S. Cl.
CPC ........ *F16K 31/20* (2013.01); *B60K 15/03519* (2013.01); *B60K 2015/03289* (2013.01)

(58) Field of Classification Search
CPC .......... F16K 31/20; B60K 2015/03289; B60K 15/03519
USPC ........................................................ 137/202
See application file for complete search history.

(56) References Cited

U.S. PATENT DOCUMENTS

| | | | |
|---|---|---|---|
| 6,688,330 B1 * | 2/2004 | Ehrman ........... | B60K 15/03519 137/433 |
| 8,220,481 B2 * | 7/2012 | Miura ................... | F16K 24/044 137/202 |
| 9,518,671 B2 * | 12/2016 | Sui .......................... | F16K 27/02 |
| 10,060,544 B2 * | 8/2018 | Song ....................... | F16K 33/00 |
| 2013/0133758 A1 * | 5/2013 | Ko ......................... | F16K 24/044 137/202 |

* cited by examiner

*Primary Examiner* — Patrick C Williams
(74) *Attorney, Agent, or Firm* — JK Intellectual Property Law, PA (57) ABSTRACT

A valve suitable for a fuel tank may include a valve housing having a housing part, and a float configured for closing a vent opening, the float being movably arranged inside the valve housing along a middle longitudinal axis running in an axial direction upward or downward. A lower section of the float faces away from the vent opening and faces toward the housing part of the valve housing. At least one spring element is at least partially arranged in or on the housing part and/or is at least partially formed by the housing part. The spring element contacts the float at least when the float moves downward in the valve housing.

18 Claims, 10 Drawing Sheets

VALVE

CROSS-REFERENCE TO RELATED APPLICATIONS

This application claims benefit to German Patent Application Number 20 2020 100 491.3, filed Jan. 29, 2020 and German Patent Application Number 20 2020 103 584.3, filed Jun. 22, 2020, both of which are incorporated in their entirety by reference herein.

TECHNICAL FIELD

The disclosure relates to a valve, especially a valve for a fuel tank.

BACKGROUND

Typically, valves are mounted between a fuel tank and a vent line so air from the fuel tank can escape or be supplied to compensate for the negative pressure. Thus, the valve serves to vent a fuel tank.

Such a valve has a valve housing, at least one inlet and/or one inlet line to allow air and/or fuel to flow in and at least one outlet (e.g., a vent opening) and/or one outlet duct (e.g., a vent duct) to allow air to escape to the vent line. Inside the valve housing, a movable float with a sealing element for closing the outlet has been arranged on an upper side facing the outlet. If fuel enters into the valve through the inlet, the float moves towards the outlet, closing it. If the fuel level inside the valve drops once again, the float drops too until it impinges onto the bottom of the valve housing. Furthermore, the float can also be moved up and down in another way during the drive, induced by accelerations that occur, among other things, when one drives over road bumps, for example. When this happens, the bottom or the valve housing must absorb the impact energy generated by the impingement of the float onto the bottom.

SUMMARY

It is an objective of the disclosure to specify a valve, in which a downward movement of the float generated, for example when the float impinges onto the bottom is absorbed and/or the noise created as a result of this is reduced.

The objective may be achieved by a valve having the characteristics according to the following disclosure.

In some aspects, the valve, which may be for a fuel tank, may include a valve housing, a float for closing a vent opening (e.g., outlet), movably arranged inside the valve housing along a middle longitudinal axis running in axial direction, at least one housing part of the valve housing facing at least a lower section of the float facing away from the vent opening, and at least one spring element (e.g., elastic element), arranged at least partially in or on the housing part and/or at least partially formed by the housing part and that at least acts together with it when the float moves downward.

The housing part having the spring element and one or several additional housing parts of the valve housing can be designed as single sections or in each case as separate housing parts. The valve can comprise one or several spring elements separated from one another, distributed in peripheral and/or radial direction of the valve or valve housing—with regard to its middle longitudinal axis.

The disclosure offers an advantage that a downward movement of the float, for example when the fuel level within the valve drops, is absorbed or cushioned by means of the spring element(s) or elastic elements, by not allowing the float to directly impact the lower side of the float facing the housing part or bottom of the valve housing, but initially being in contact or making contact with the spring element, which cushions the impact.

According to an advantageous embodiment, the spring element is at least partially formed and/or delimited by at least one recess formed in the housing part and/or groove.

In particular, the housing part encompassing the spring element may have at least one flat section facing the lower section of the float and/or at least one cylindrical section extending from the flat section, and the at least one spring element is formed and/or arranged in the flat section and/or in or on the at least one cylindrical section.

According to an advantageous embodiment, the spring element is fully formed and/or delimited by a recess formed in the flat section of the housing part and/or groove. The spring element is thus fully formed in the flat section of the housing part.

A preferred further development provides for the spring element to extend in peripheral direction, either fully or at least in sections, in the flat section.

According to an advantageous embodiment, the spring element extends in radial direction, either fully or at least in sections, in the flat section.

Furthermore, in the flat section, the spring element can extend either fully or at least in sections, in a direction towards a component in radial direction and in peripheral direction.

According to an advantageous alternative, the spring element has a first segment and a second segment, wherein the first segment is formed and/or delimited by at least one recess formed in the flat section of the housing part and/or groove and wherein the second segment of the spring element is formed and/or delimited by at least one recess formed in the cylindrical section of the housing part and/or groove.

In the cylindrical housing part, the second segment of the spring element extends, and may do so in axial direction.

According to a variation, the housing part has—with regard to the radial direction—an inner or internal cylindrical section, and the second segment of the spring element is formed in the inner cylindrical housing part. The inner cylindrical section typically serves to guide the float by gripping a guiding tappet of the float, thereby preventing it from tipping inside the valve housing.

In another variation, the housing part has—with regard to the radial direction—an outer or external cylindrical section and the second segment of the spring element is formed in the outer cylindrical section. The outer cylindrical section largely encloses the interior space of the valve housing and also contributes to guide the float.

In this case, in the flat section, the first segment of the spring element extends, for example inward or outward in radial direction and/or in peripheral direction.

Another alternative provides for the spring element to extend, starting from the cylindrical section of the housing part, to an interior space bordered by the cylindrical section, in a direction towards a component in radial direction or in axial direction.

So the spring element can act together with the float, for example to cushion a downward movement of the float, the spring element has preferably a contact area for acting together with the float.

The contact area is elevated compared with the remaining spring element, particularly in axial direction towards the float. As a result of this, an early contact of the float with the spring element is ensured during the downward movement.

According to an advantageous further development, the spring element has a free end section and a fixed end section connected to the housing part, and the contact area is formed or arranged on the free end section.

Alternately, the spring element can have a first and a second end section connected to the housing part, thus both sides attached to the housing part. In this case, the contact area is arranged or formed in a central section or in a third, free end section of the spring element.

The spring element may have linear and curved longitudinal segments.

Moreover, the spring element can be V-shaped, U-shaped, or T-shaped.

Other alternatives provide for the spring element to have a constant diameter or a varying diameter over its entire length.

In particular, a groove that forms or delimits the spring element may have a constant width over its entire length.

A recess delimiting or forming the spring element can have a circular, oval, triangular, rectangular or polygonal shape.

BRIEF DESCRIPTION OF THE DRAWINGS

Various embodiments of the valve according to the disclosure are depicted in the enclosed schematic drawings as set forth below.

DETAILED DESCRIPTION

The valve 100, shown in FIG. 1A to FIG. 1F, is intended for venting a fuel tank and has a valve housing with several housing parts 2a, 2b, 2c. A first housing part 2a and a second housing part 2b close the valve 100 towards the surroundings, a third housing part 2c (e.g., insert) is introduced inside the first housing part 2a and serves to guide a float 3, which is arranged inside the valve housing and movably mounted on the middle longitudinal axis M running along axial direction A. Above a lower section of the valve 100, inlets 4 have been provided, arranged here in the first housing part 2a with regard to the installation position, so fuel can flow into the valve. As a result of this, the float 3 for closing a vent opening 5a of the valve 100 located in the upper section of the valve 100 with regard to the installation position is moved upward. Until the vent opening 5a is closed, the air present in the valve 100 can escape from the valve 100 through it and an outlet 5b present in the second housing part 2b. Afterwards, a drop of the fuel level inside the valve 100 leads to a drop or downward movement of the float 3. A housing part facing the lower segment of the float 3, here the housing part 2a formed in the shape of a cup, has a flat section 6, in which spring elements 1—here three of them—are formed, delimited in each case by two arched grooves 7a, 7b formed fully in the flat section 6 that merge in a groove section 7c likewise formed like an arch. The arched grooves 7a, 7b extend in each case in peripheral direction U, so that—with regard to the radial direction R—a spring element 1 is formed by an outer and inner arched groove 7a, 7b. The arched grooves 7a, 7b have a constant width along their entire length. Therefore, the spring element 1 has a curved longitudinal segment with constant diameter and likewise extends here fully in peripheral direction U. A free end section 1a of the spring elements 1 makes contact in each case with the float 3 or at least makes contact with it during the downward movement or at least during part of it, in order to cushion its downward movement. Thus, the free end section 1a forms a contact area 8 of the spring element 1 with the float 3. To strengthen the damping effect or allow an early damping of the downward movement, the free end section 1a is elevated in axial direction A compared with the remaining element or protrudes in axial direction A towards the float 3 or forms such an elevated or protruding contact area 8. A second end section 1b is connected to the housing part 2a or overlaps with the flat section 6 of the housing part 2a. By means of the elongated slot provided for the housing part 2a, the so-called keyhole, the closing behavior of the float 3 can be influenced, particularly if sloshing movements occur. Furthermore, this helps the flowing-through of the valve 100 during venting.

The following figures show in each case only a housing part 2a that has the spring elements 1. The basic structure and mode of operation of such a valve having a housing part 2a correspond to those of the valve 100 described above.

Figure 1A:
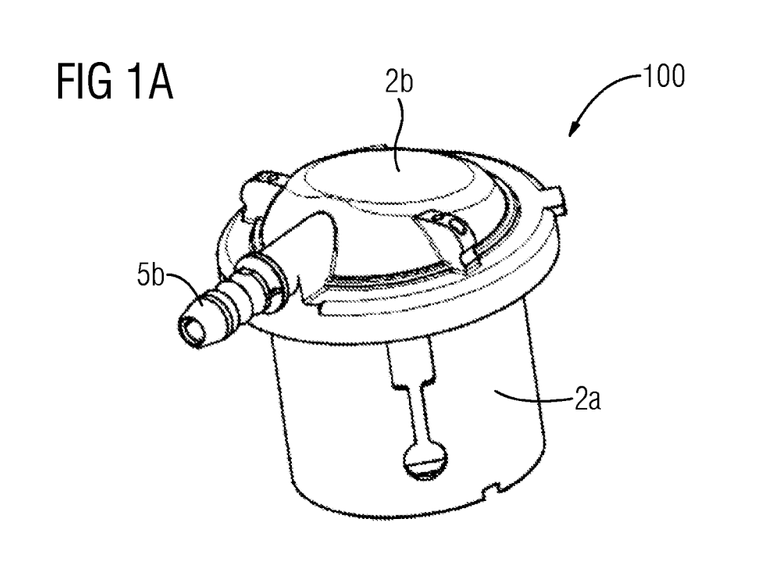
FIG. 1A is a perspective view of a valve with a spring element according to a first embodiment.
Figure 1B:
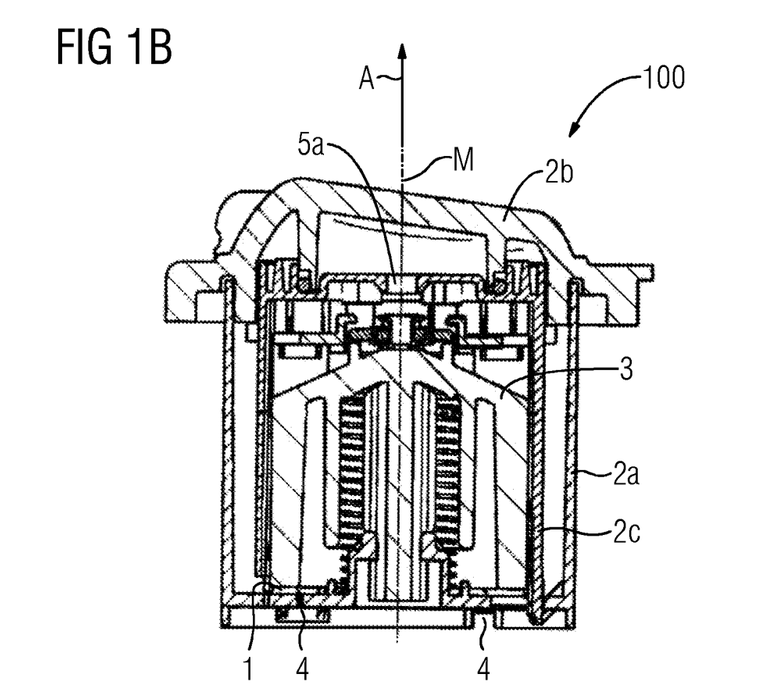
FIG. 1B is a sectional view of the valve with a spring element according to the first embodiment.
Figure 1C:
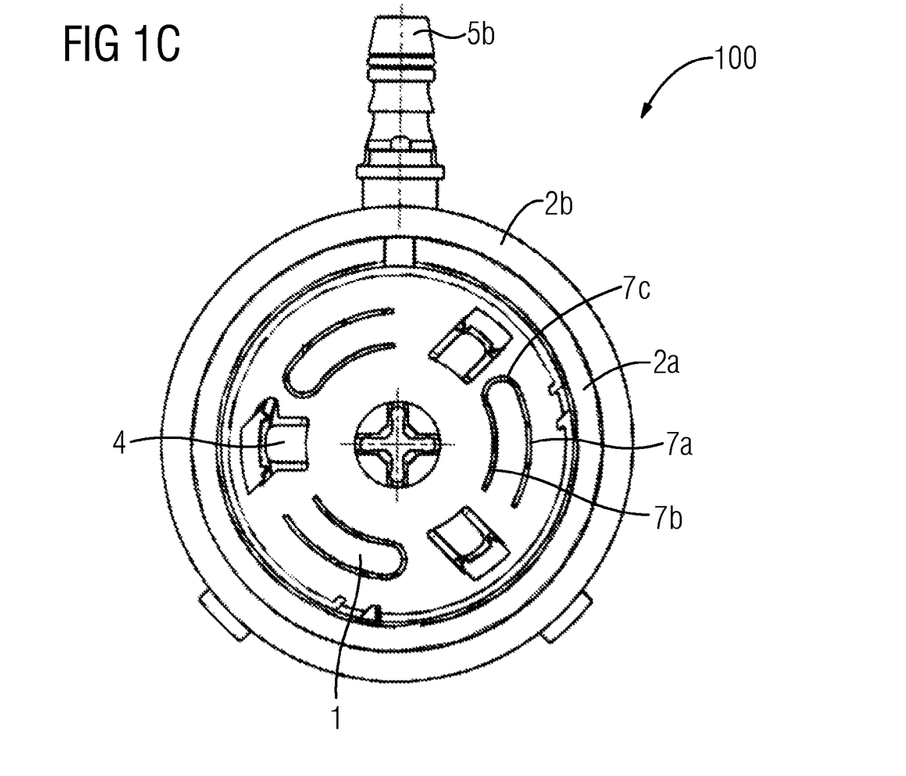
FIG. 1C is a bottom view of the valve with a spring element according to the first embodiment.
Figure 1D:
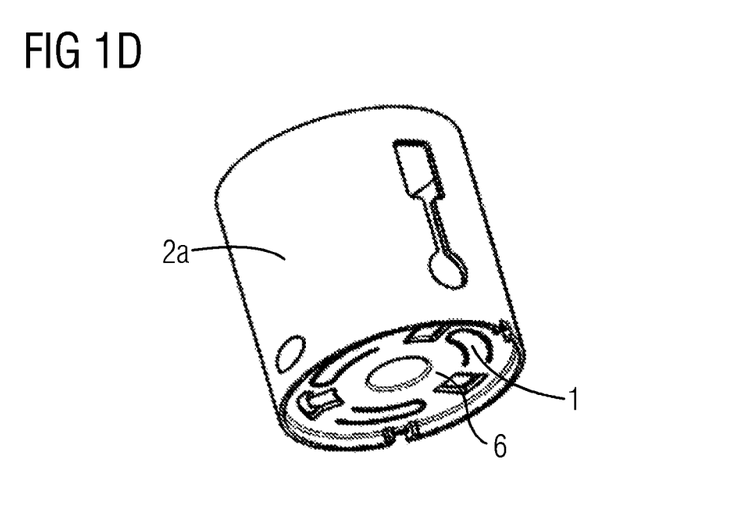
FIG. 1D is a perspective view of the housing part of the valve according to FIGS. 1A-1C with a spring element according to the first embodiment.
Figure 1E:
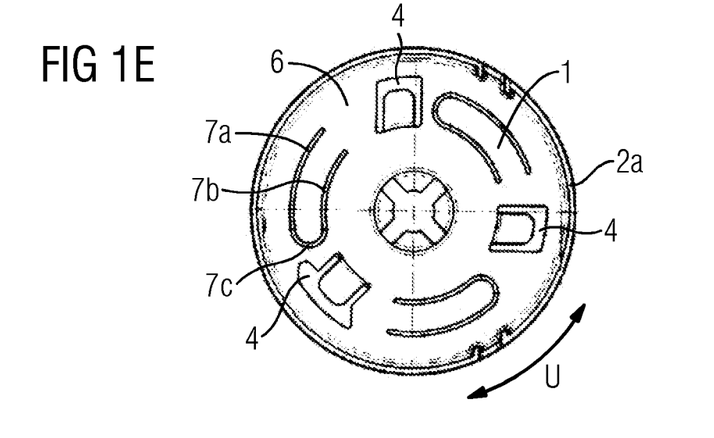
FIG. 1E is a bottom view of the housing part of the valve according to FIGS. 1A-1C with a spring element according to the first embodiment.
Figure 1F:
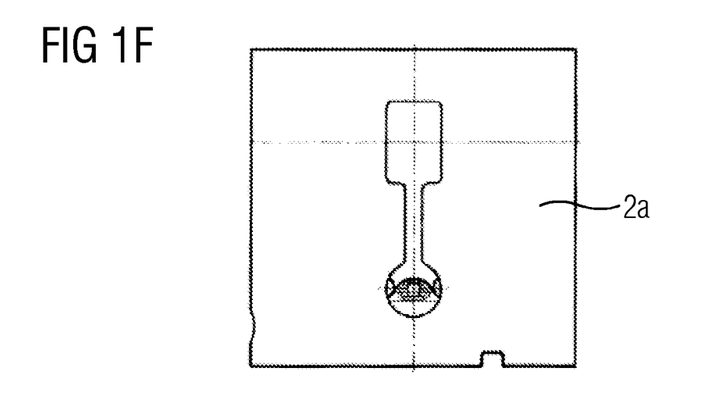
FIG. 1F is a side view of the housing part of the valve according to FIGS. 1A-1C with a spring element according to the first embodiment.
Figure 1G:
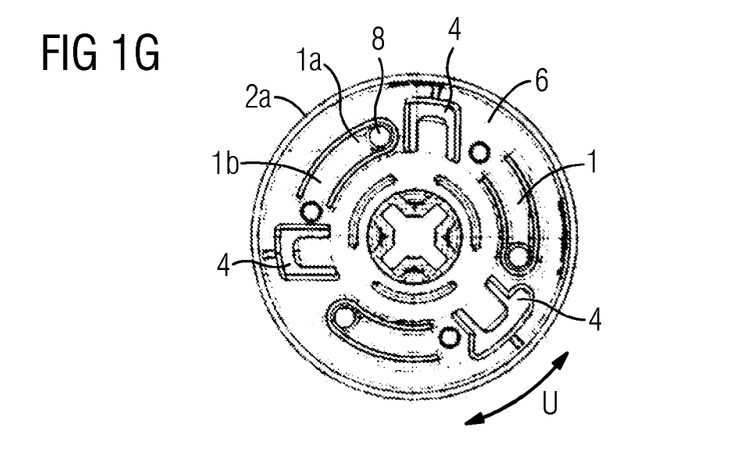
FIG. 1G is a top view of the housing part of the valve according to FIGS. 1A-1C with a spring element according to the first embodiment.
Figure 2A:
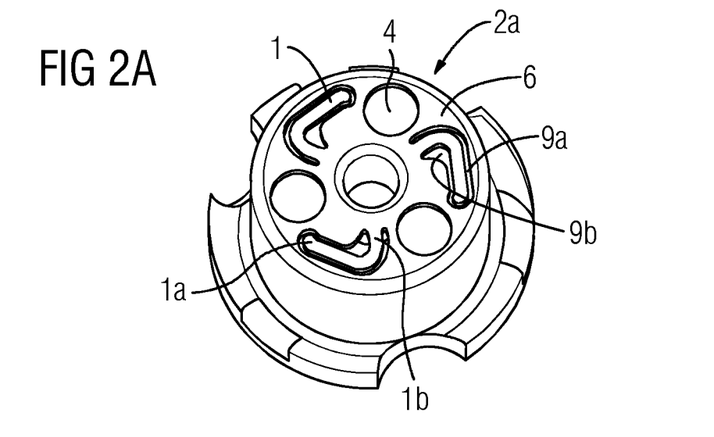
FIG. 2A is a bottom view of a housing part of a valve with a spring element according to a second embodiment in perspective.
Figure 2B:
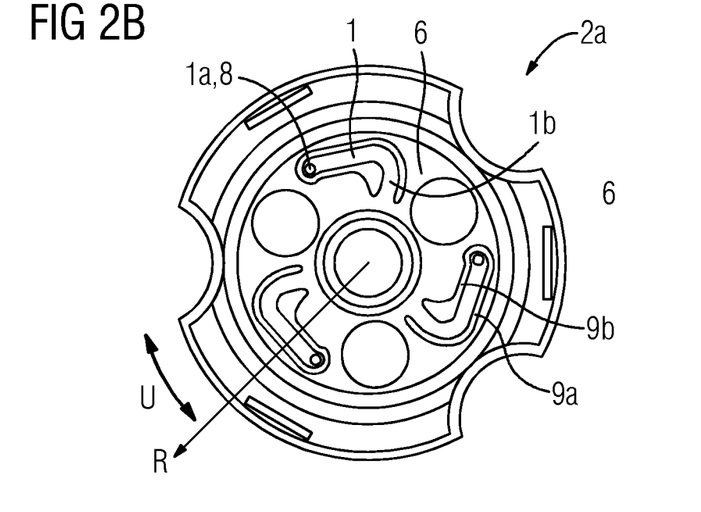
FIG. 2B is a top view of the housing part according to FIG. 2A with a spring element according to the second embodiment.
Figure 2C:
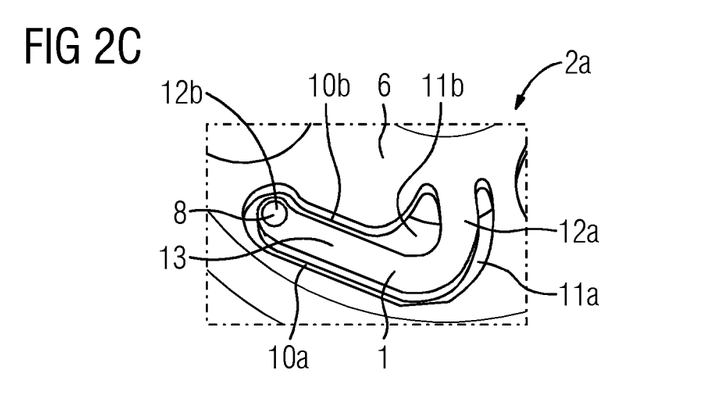
FIG. 2C is a detailed view of the spring element according to the second embodiment according to FIG. 2A and FIG. 2B.

In the embodiment shown in FIG. 2A to FIG. 2C, the spring elements 1, here once again three of them, are formed in each case between two recesses or grooves 9a, 9b that are fully formed in the flat section 6 of the housing part 2a. The spring elements 1 and the recesses or grooves 9a, 9b have longitudinal sections 10a, 10b that run straight as well as longitudinal sections 10a, 10b, 11a, 11c that run curved, wherein the longitudinal sections 10a, 10b, 11a, 11c have a constant width and the longitudinal section 11b has a varying width. The spring element 1 also has curved longitudinal sections 12a, 12b, here formed on the first and second end section 1a, 1b, and a central, linear longitudinal section 13 lying in between. The linear longitudinal section 13 runs perpendicularly to the radial direction R of the housing part 2a. The curved longitudinal section 12a runs in a direction towards a component in radial direction R and in peripheral direction U. The curved longitudinal section 12b runs largely in peripheral direction U and forms the contact area 8 for the float 3.

Figure 3A:
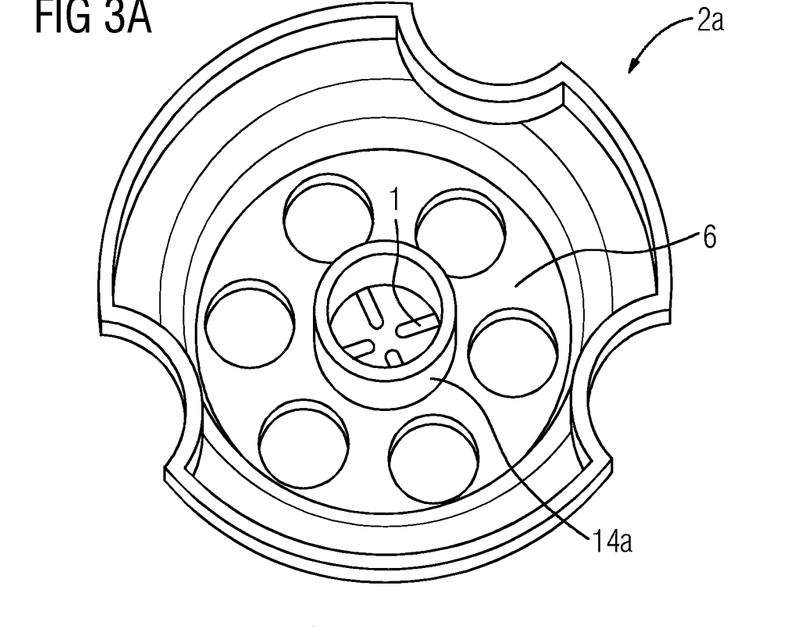
FIG. 3A is a top view of a housing part of a valve with a spring element according to a third embodiment in perspective.
Figure 3B:
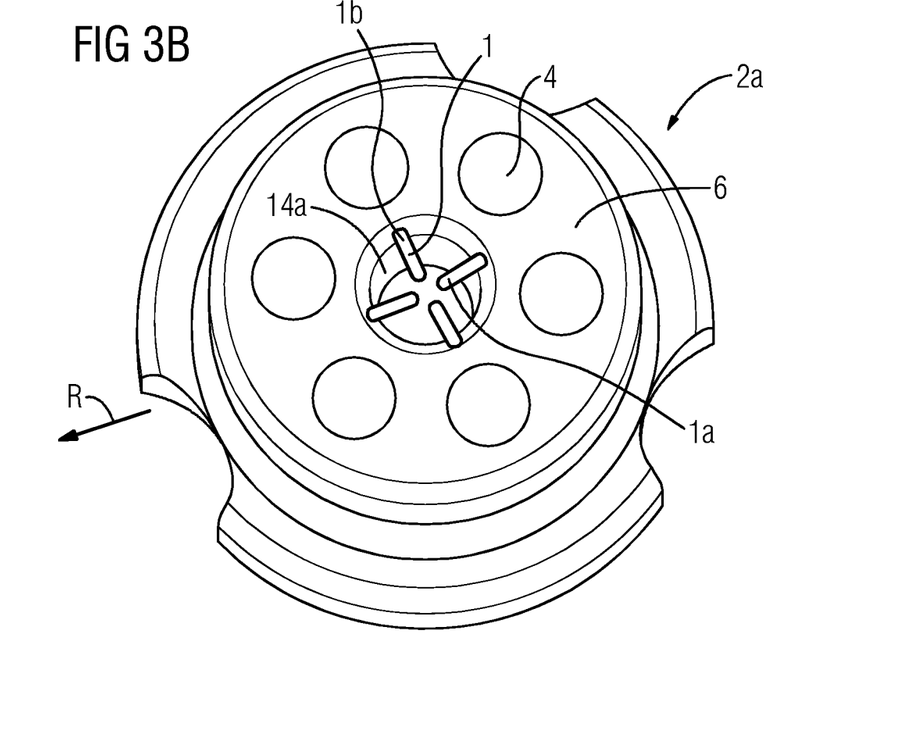
FIG. 3B is a bottom view of the housing part according to FIG. 3A with a spring element according to the third embodiment in perspective.
Figure 3C:
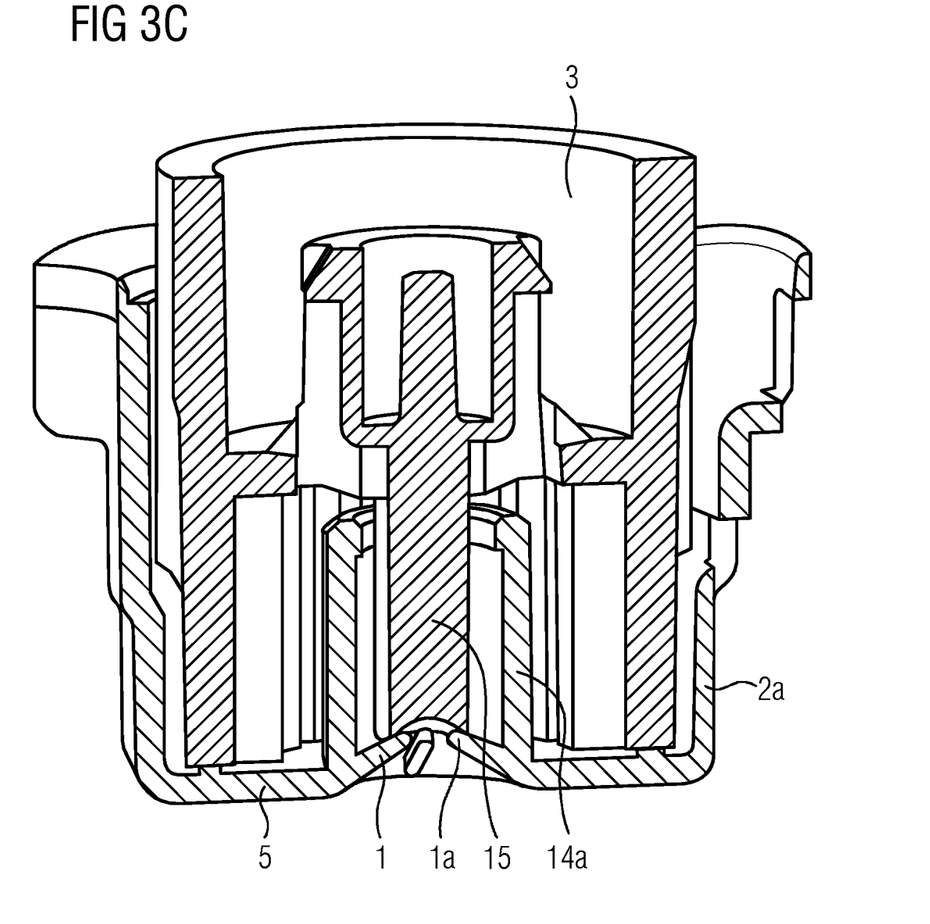
FIG. 3C is a sectional view of the housing part according to FIG. 3A and FIG. 3B with a spring element according to the third embodiment with float.

In the embodiment shown in FIG. 3A to FIG. 3C, the inner sides of the spring elements 1, here four of them, are arranged on an inner, cylindrical section 14a of the housing part 2a and act together with a guiding section 15 of the float 3 introduced inside the cylindrical section 14a, in order to achieve a cushioning or damping of the float 3 when it moves downward. The spring elements 1 are linear, in this example "rod-shaped", and starting from the cylindrical section 14a, they extend both in radial direction R and also in axial direction A into an interior formed by the cylindrical section 14a, so that a first end section 1a is or comes in contact with the guiding section 15 of the float 3. The spring elements 1 are arranged, regularly spaced from one another, in peripheral direction on the cylindrical section 14a.

Figure 4A:
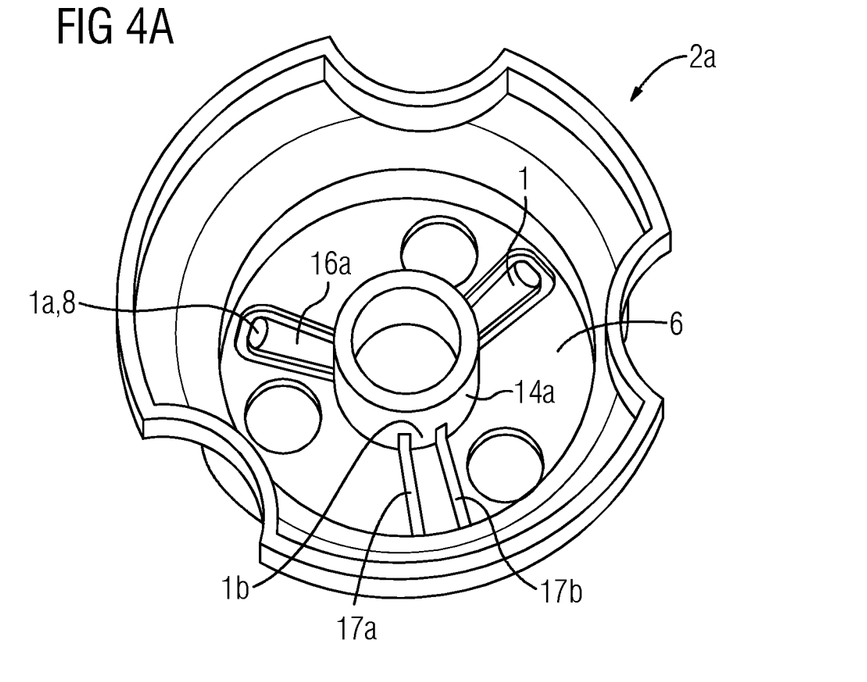
FIG. 4A is a top view of a valve with a spring element according to the fourth embodiment in perspective.
Figure 4B:
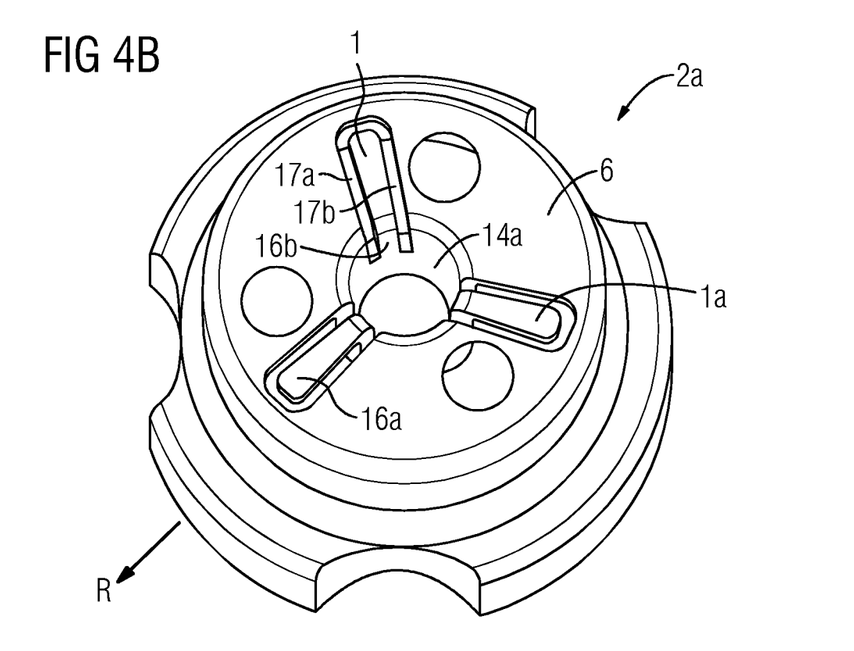
FIG. 4B is a bottom view of the housing part according to FIG. 4A with a spring element according to the fourth embodiment in perspective.

In the embodiment shown in FIG. 4A to FIG. 4B, spring elements—here three of them—have been formed which, with a first segment 16a, extend to the flat section 6 of the housing part 2a, and with a second segment 16 b to the inner, cylindrical section 14a of the housing part 2a, wherein a free end section 1a, which forms the contact area 8, is formed in the flat section 6. The spring elements 1 are oriented in radial direction R in the flat section 6 and lengthened in the inner, cylindrical section 14a, in which they extend in axial direction A. As a result of that, the spring elements 1 are "L-shaped" in a vertical section. The spring elements 1 are themselves in each case likewise delimited from one another by grooves 17a, 17b extending L-shaped in the linear and in the cylindrical section 14a and in the flat section 6. Starting from the cylindrical section 14a, the spring elements 1 widen to their first, free end section 1a. The grooves 17a, 17b have a constant width over their entire length. Due to such design, the length of the spring element 1 is reduced in the flat section 6, and a length of the spring element 1 necessary for damping the downward movement of the float 3 is reached by forming the second segment 16b in the inner, cylindrical section 14a.

Figure 5A:
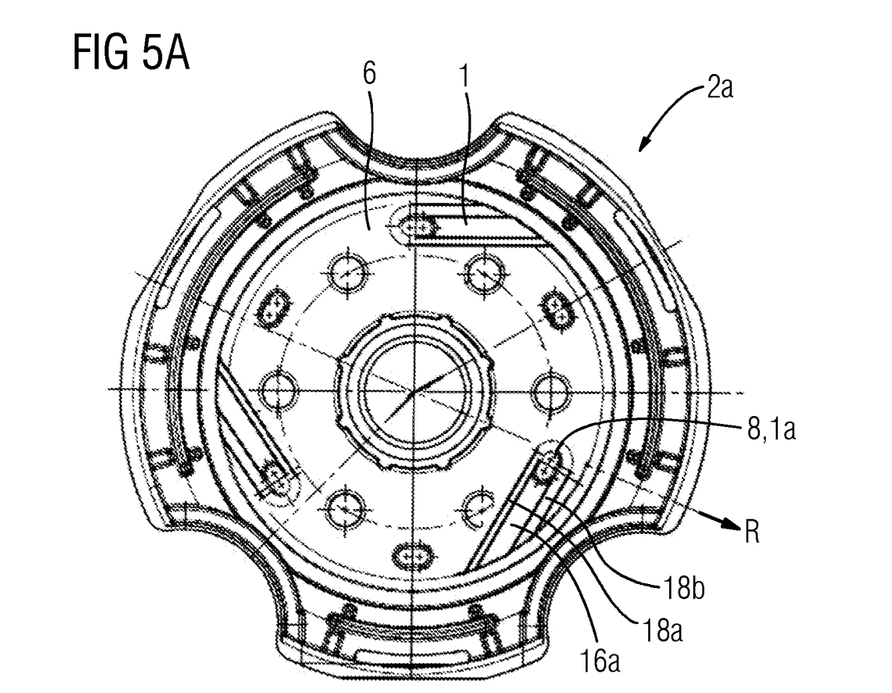
FIG. 5A is a top view of a valve with a spring element according to a fifth embodiment in perspective.
Figure 5B:
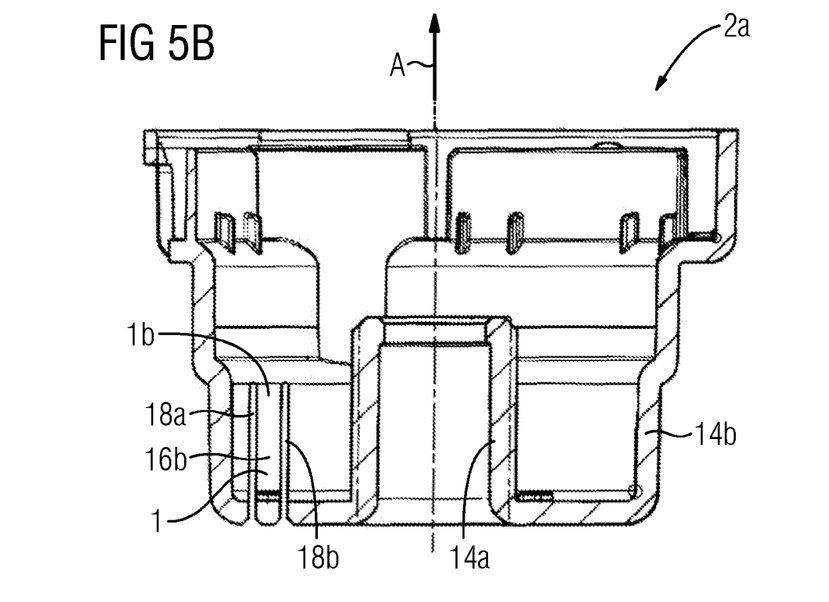
FIG. 5B is a sectional view of the housing part with a spring element according to the fifth embodiment.

In the embodiment shown in FIG. 5A to FIG. 5B, the spring elements—here three of them—are formed straight in the flat section 6 and have a constant diameter across their entire length. In addition, the spring elements 1 extend into an outer, cylindrical section 14b of the housing part 2a, so that the spring elements 1 are "L-shaped" once again. The segment 16b of the spring elements 1 formed in the outer, cylindrical section 14b is in each case delimited by straight grooves 18a, 18b with constant width that extend in axial direction A, so that the segments 16b also extend in axial direction A in the outer, cylindrical section 14b, namely downward towards the flat section 6. A second end section 1b merges with the cylindrical section 14b. The segments 16a of the spring elements 1 formed in the flat section are likewise delimited by grooves 18a, 18b and also formed straight in the flat section 6, have constant width and run in a direction towards a component in radial direction and in peripheral direction U in the flat section 6. Thus, the spring elements 1 extend from the outer, cylindrical section 14b into the flat section 6. A first end section 1a of the spring element 1, in turn, forms a contact area 8 for the float 3. Also in this embodiment, the formation of the spring element 1 is reduced in the flat section 6 and a length of the spring element 1 necessary for damping the downward movement of the float 3 is achieved by forming the second segment 16b in the outer, cylindrical section 14b.

Figure 6:
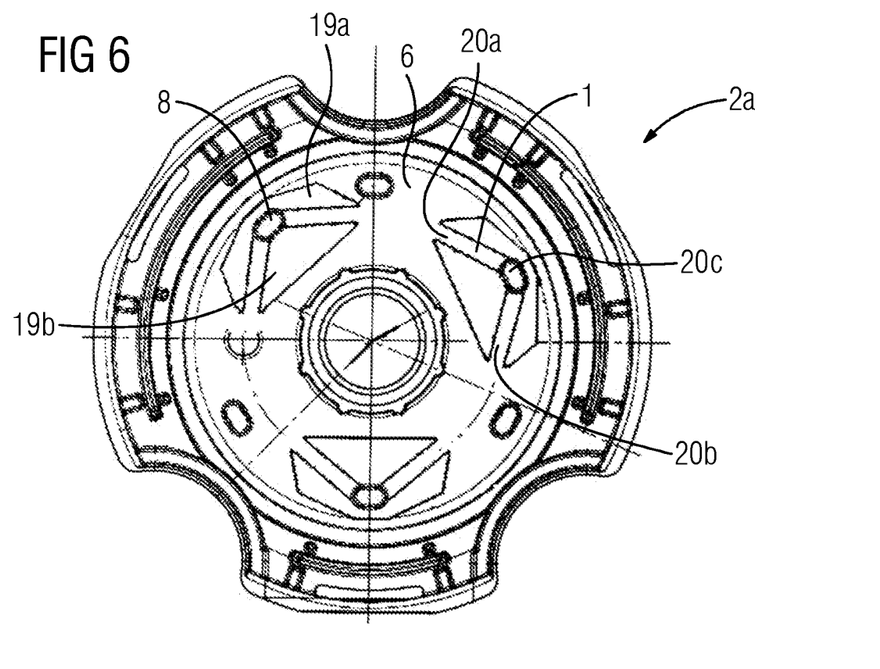
FIG. 6 is a top view of a housing part of a valve with a spring element according to a sixth embodiment in perspective.
Figure 7:
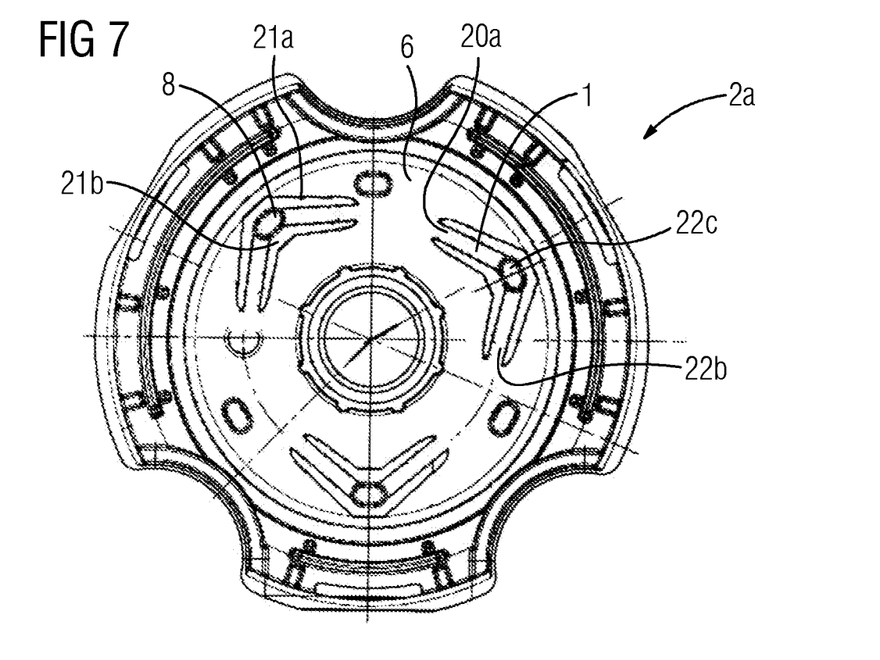
FIG. 7 is a top view of a housing part of a valve with a spring element according to a seventh embodiment in perspective.
Figure 8:
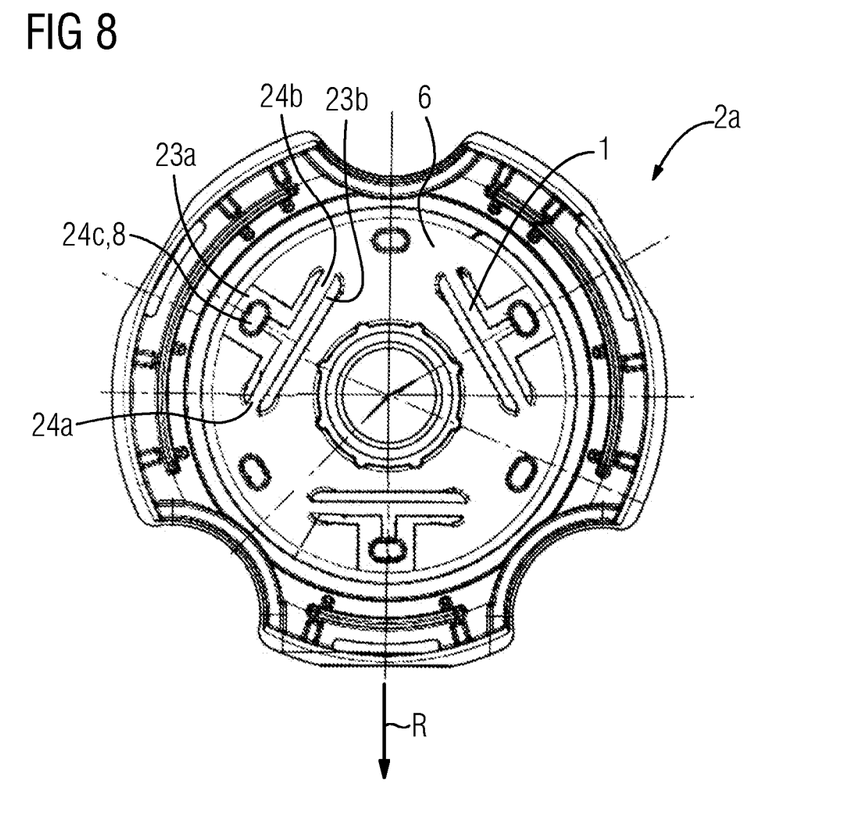
FIG. 8 is a top view of a housing part of a valve with a spring element according to an eighth embodiment in perspective.

In the embodiments shown in each case in FIG. 6 to FIG. 8, the spring elements 1, in each case three of them, are fully arranged and evenly spaced from one another in the flat section in peripheral direction U.

In the embodiment shown in FIG. 6, the spring elements 1 are formed or delimited in the flat section 6 by the flat recesses 19a, 19b formed in the housing part 2a. The outer recess 19a—with regard to the radial direction R—is largely a U-shaped polygon, the inner recess 19b—with regard to the radial direction R—has a triangular shape. The spring element 1 has in each case a first and a second fixed end section 20a, 20b connected to the housing part 2a. Thus, the spring element is connected on both sides. Starting from these end sections 20a, 20b, the spring elements 1 extend straight in a direction towards a component in radial direction R and towards the exterior in peripheral direction U. A central section 20c of the spring elements 1 lying between the end sections 20a, 20b and a central section 20c of the spring elements 1 separated from it in radial direction forms the contact area 8. Thus, the spring elements 1 are formed overall in a V-shape and have a constant diameter over their entire length.

The embodiment shown in FIG. 7 differs from the previous embodiment shown in FIG. 6 by the form of the recesses that form or delimit the spring element 1. According to FIG. 7, these recesses are designed as V-shaped grooves 21a, 21b. The spring elements 1 are likewise V-shaped and have a first and second end section 22a, 22b as well as a central section 22c. The grooves 21a, 21b have largely a linear design and a curved shape merely in the areas surrounding the central section 22c and their width widened. The contact area 8 is, in turn, formed in the central section 22c.

The embodiment shown in FIG. 8 includes three spring elements 1 formed as "torsion springs." The spring elements 1 are largely T-shaped and—with regard to the radial direction R—their outer sides are delimited by a T-shaped recess 23a and their inner sides by a groove 23b extending perpendicularly to the radial direction R. The spring elements 1 are connected to the housing part 2a with a first and second end section 24a, 24b or merge with it. A third, free end section 24c protrudes in radial direction R into the recess 23a and creates the contact area 8 for the float 3. Thus, the cushioning or damping of the float 3 takes place through the spring elements 1 connected on both sides to the housing part 2a, wherein the forces that are generated when there is contact with the float 3 in the contact area are transferred to a rotation of the spring elements 1. In other words, the free end section 24c creates a kind of lever, and consequently the spring elements 1 are formed as a kind of "torsion elements."

LIST OF REFERENCE SIGNS

1 Spring element
1a Free end section of the spring element
1b Fixed end section of the spring element
2a First housing part
2b Second housing part
2c Third housing part
3 Float
4 Inlets
5a Vent opening
5b Outlet
6 Flat section
7a, b Groove
8 Contact area
9a, 9b Groove/Recess
10a, 10b Linear longitudinal sections
11a, 11b, 11c Curved longitudinal sections
12a, 12b Curved longitudinal sections
13 Linear longitudinal section
14a Inner, cylindrical section
14b Outer, cylindrical section
15 Guiding section of the float
16a Segment of the spring element
16b Segment of the spring element
17a, 17b Groove
18a, 18b Groove
19a, 19b Recess
20a, 20b End sections
20c Central section
21a, 21b Groove
22a, 22b End sections
22c Central section
23a Recess
23b Groove
24a, 24b End sections
24c Free end section
100 Valve
A Axial direction
M Middle longitudinal axis
U Peripheral direction
R Radial direction

The invention claimed is:

1. A valve suitable for a fuel tank, comprising:
   a valve housing having a housing part;
   a float configured for closing a vent opening, the float being movably arranged inside the valve housing along a middle longitudinal axis (M) running in an axial direction (A) upward or downward;
   a lower section of the float facing away from the vent opening and facing toward the housing part of the valve housing; and
   at least one spring element at least partially arranged in or on the housing part and/or at least partially formed by the housing part, the spring element contacting the float at least when the float moves downward in the valve housing;
   wherein the housing part has at least one flat section facing the lower section of the float and/or having at least one cylindrical section starting from the flat section extending in the axial direction (A), and
   wherein the at least one spring element is formed and/or arranged in the flat section and/or in or on the at least one cylindrical section; and
   wherein the at least one spring element has a first segment and a second segment, wherein the first segment is formed and/or delimited by at least one recess and/or at least one groove formed in the flat section of the housing part, and wherein the second segment of the at least one spring element is formed and/or delimited by at least one recess and/or at least one groove formed in the at least one cylindrical section of the housing part.

2. The valve according to claim 1, wherein the at least one spring element extends fully or at least partially in the flat section in a peripheral direction (U).

3. The valve according to claim 1, wherein the at least one spring element extends fully or at least partially in the flat section in a radial direction (R).

4. The valve according to claim 1, wherein the second segment of the at least one spring element extends in the axial direction (A) in the cylindrical housing part.

5. The valve according to claim 1, wherein the housing part has—with regard to the radial direction (R)—an inner cylindrical section and the second segment of the at least one spring element is formed in the inner cylindrical section.

6. The valve according to claim 1, wherein the housing part has—with regard to the radial direction (R)—an outer cylindrical section and the second segment of the at least one spring element is formed in the outer cylindrical section.

7. The valve according to claim 1, wherein the first segment of the at least one spring element extends in the flat section inward or outward in the radial direction (R) and/or in the peripheral direction (U).

8. The valve according to claim 1, wherein the at least one spring element, starting from the at least one cylindrical section of the housing part, extends in an interior space bordered by the at least one cylindrical section in a direction towards a component in a radial direction (R) and/or in the axial direction (A).

9. The valve according to claim 1, wherein the at least one spring element has a contact area for contacting the float.

10. The valve according to claim 9, wherein the contact area is elevated or protrudes in the axial direction (A) toward the float.

11. The valve according to claim 9, wherein the at least one spring element has a free end section and has a fixed end section connected to the housing part, and wherein the contact area is arranged or formed on the free end section.

12. The valve according to claim 9, wherein the at least one spring element has a first fixed end section and a second fixed end section both connected to the housing part, and wherein the contact area is arranged or formed in a central section or in a third, free section of the at least one spring element.

13. The valve according to claim 1, wherein the at least one spring element is one of V-shaped, U-shaped, or T-shaped.

14. The valve according to claim 1, wherein the at least one spring element has linear longitudinal sections and curved longitudinal sections.

15. The valve according to claim 1, wherein the at least one spring element has a constant diameter over an entire length of the at least one spring element.

16. The valve according to claim 1, wherein the at least one spring element has a varying diameter over an entire length of the at least one spring element.

17. The valve according to claim 1, wherein the at least one groove has a constant width over an entire length of the at least one spring element.

18. The valve according to claim 1, wherein the at least one recess has one of a circular, oval, triangular, rectangular, or polygonal shape.

\* \* \* \* \*